(12) United States Patent
Matsui

(10) Patent No.: US 11,533,218 B2
(45) Date of Patent: Dec. 20, 2022

(54) COMMUNICATION METHOD AND CONTROL METHOD IN INFORMATION PROCESSING APPARATUS

(71) Applicant: CANON KABUSHIKI KAISHA, Tokyo (JP)

(72) Inventor: Yusuke Matsui, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 16/707,409

(22) Filed: Dec. 9, 2019

(65) Prior Publication Data

US 2020/0204435 A1    Jun. 25, 2020

(30) Foreign Application Priority Data

Dec. 21, 2018    (JP) .............................. JP2018-240141

(51) Int. Cl.
*H04L 41/0654* (2022.01)
*H04L 41/046* (2022.01)
(Continued)

(52) U.S. Cl.
CPC ........ *H04L 41/0654* (2013.01); *H04L 41/046* (2013.01); *H04L 41/0631* (2013.01);
(Continued)

(58) Field of Classification Search
None
See application file for complete search history.

(56) References Cited

U.S. PATENT DOCUMENTS 7,093,008 B2 *  8/2006  Agerholm ........... H04L 41/0213
                                                       709/223
7,739,346 B1 *  6/2010  Goldschlager ...... H04L 41/0213
                                                       709/207
(Continued)

FOREIGN PATENT DOCUMENTS

JP    2010-108397 A    5/2010
JP    2010-273297 A    12/2010
JP    2016-116104 A    6/2016

OTHER PUBLICATIONS

Tsurunaga, Shinichi, "Useful for the next 10 years! Introduction to web technologies TCP/IP HTTP URL HTML" WEB+DB PRESS, Japan, Gijutsu-Hyohron Co., Ltd. (May 25, 2014) pp. 29-35, vol. 80.

(Continued)

*Primary Examiner* — Lonnie V Sweet
(74) *Attorney, Agent, or Firm* — Carter, DeLuca & Farrell LLP

(57) ABSTRACT

A method for communicating between apparatuses, comprises: in a first apparatus, generating a second packet according to a second protocol, the second packet including a first packet according to a first protocol; in the first apparatus, sending the generated second packet to a second apparatus; in the second apparatus, receiving the second packet; in the second apparatus, determining whether a response to the first packet included in the second packet is possible; and in the second apparatus, in a case where it is determined that a response to the first packet is impossible, including status information corresponding to a cause for the impossibility of the response in a response packet corresponding to the second packet and sending the response packet to the first apparatus.

14 Claims, 13 Drawing Sheets

| DEVICE STATE | STATUS CODE OF HEADER PORTION |
|---|---|
| SNMP COMMUNICATION IS NOT SUPPORTED | 404(NotFound) |
| WHEN BOTH SNMPv1/v3 ARE DISABLED | 403(Forbidden) |
| WHEN ONE OF SNMPv1/v3 IS DISABLED | 204(NoContent) |
| COMMUNITY NAME MISMATCH | 503(Service Unavailable) |
| NORMAL (CAN COMMUNICATE WITH DEVICE) | 200(OK) |

(51) Int. Cl.
*H04L 69/22* (2022.01)
*H04L 41/0631* (2022.01)
*H04L 45/74* (2022.01)
*H04L 41/22* (2022.01)

(52) U.S. Cl.
CPC .............. *H04L 41/22* (2013.01); *H04L 45/74* (2013.01); *H04L 69/22* (2013.01)

(56) References Cited

U.S. PATENT DOCUMENTS

| | | | |
|---|---|---|---|
| 9,537,808 B1* | 1/2017 | Giansiracusa | H04L 41/0226 |
| 2002/0150086 A1* | 10/2002 | Bailey | H04L 29/1216 370/352 |
| 2004/0019636 A1 | 1/2004 | St. Pierre et al. | |
| 2007/0180086 A1* | 8/2007 | Fang | H04L 63/105 709/223 |
| 2008/0077700 A1* | 3/2008 | Hibino | H04L 63/16 709/230 |
| 2011/0295989 A1* | 12/2011 | Kiyoto | H04L 41/0266 709/223 |
| 2012/0198082 A1* | 8/2012 | Gaertner | H04L 67/10 709/228 |

OTHER PUBLICATIONS

Japanese Office Action issued in corresponding JP Patent Application No. 2018-240141, dated Sep. 30, 2022, with English translation.

\* cited by examiner

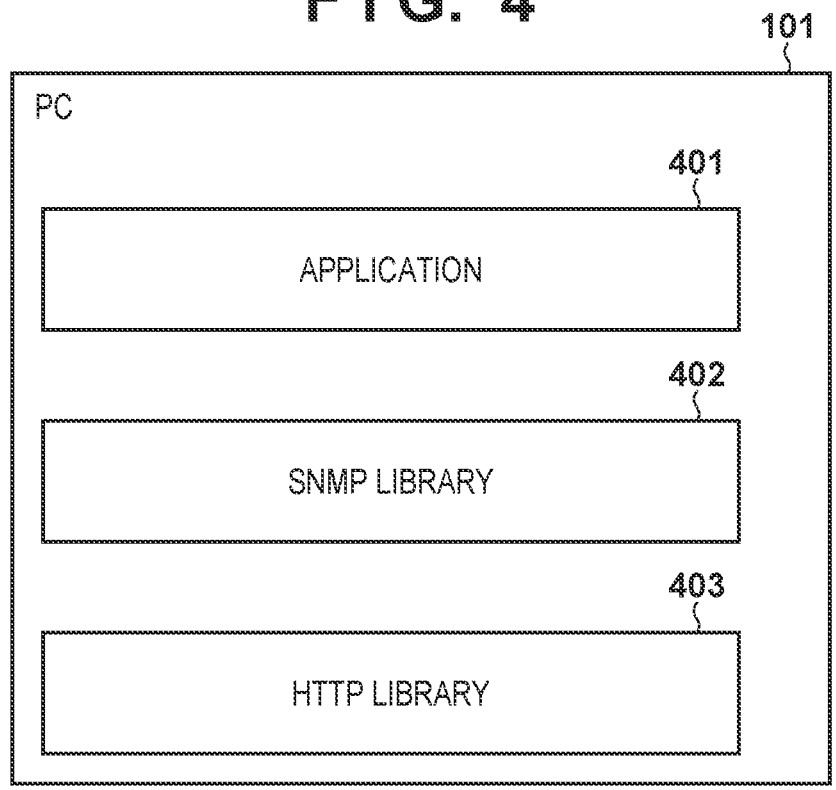
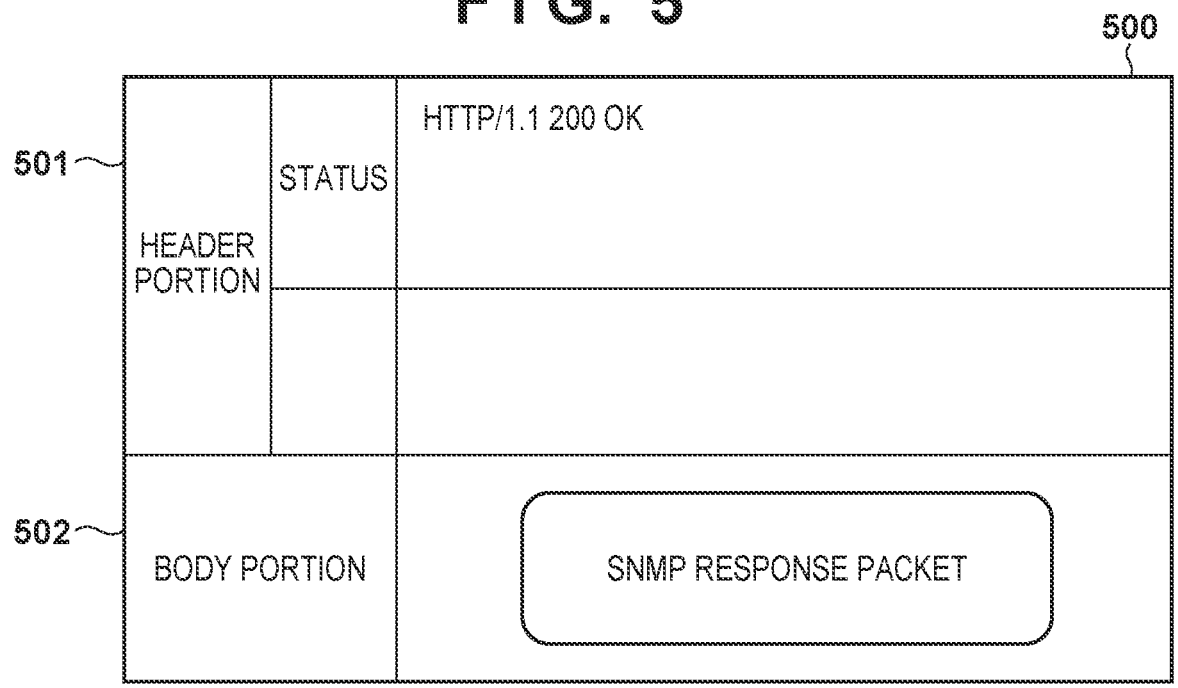

| DEVICE STATE | STATUS CODE OF HEADER PORTION |
|---|---|
| SNMP COMMUNICATION IS NOT SUPPORTED | 404(NotFound) |
| WHEN BOTH SNMPv1/v3 ARE DISABLED | 403(Forbidden) |
| WHEN ONE OF SNMPv1/v3 IS DISABLED | 204(NoContent) |
| COMMUNITY NAME MISMATCH | 503(Service Unavailable) |
| NORMAL (CAN COMMUNICATE WITH DEVICE) | 200(OK) |

FIG. 10

|  | ADMINISTRATOR MODE   LOG OFF |
|---|---|
| MENU | SNMP SETTING |
| DEVICE STATE | SNMPv1 SETTING |
| UTILITY | ● DISABLE |
| MAIN BODY SETTINGS | ○ ENABLE |
| JOB MANAGEMENT | |
| SECURITY | SNMPv3 SETTING |
| LAN SETTINGS | ● DISABLE |
| LANGUAGE SELECTION | ○ ENABLE |
| | OK |

1000

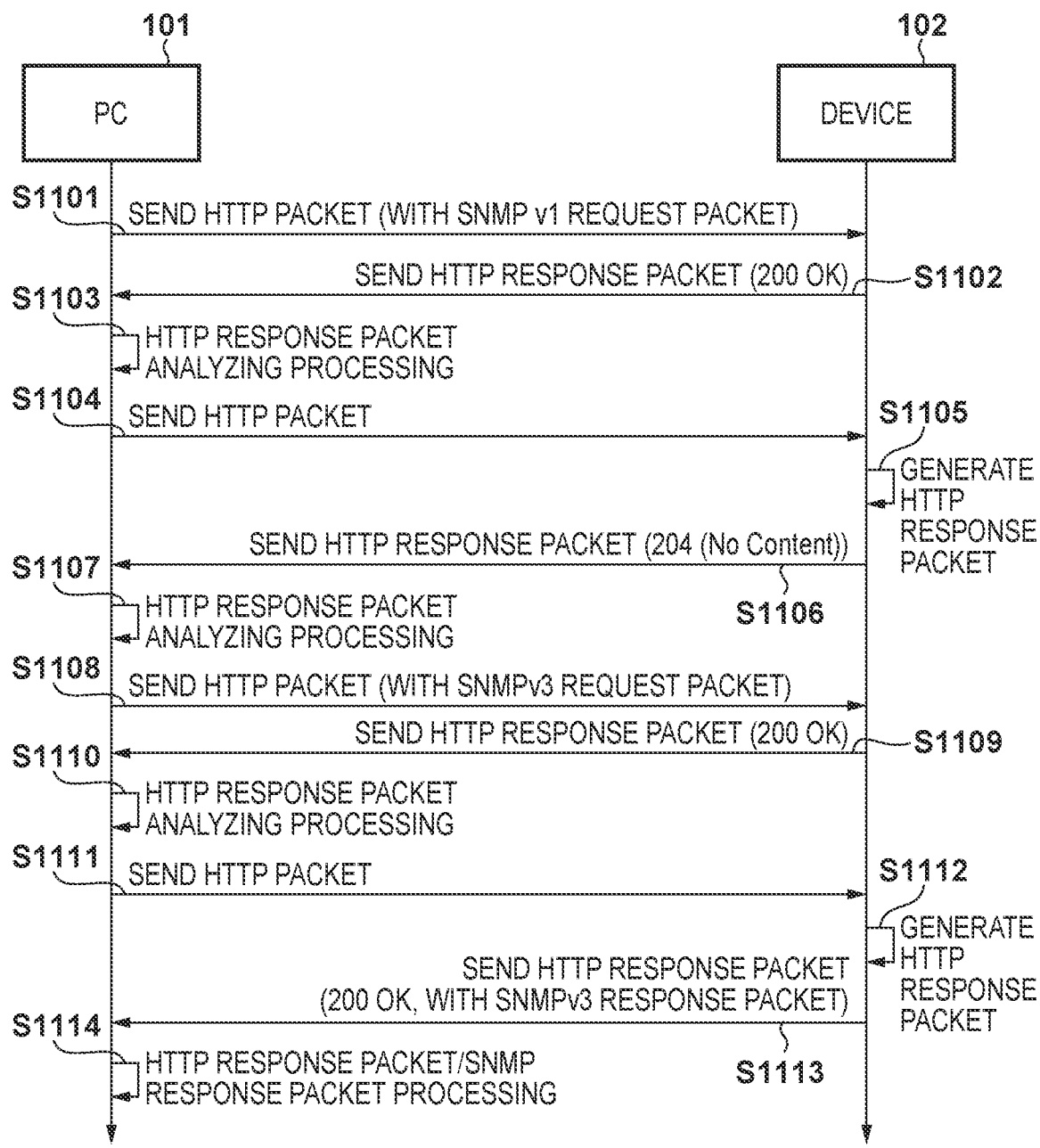

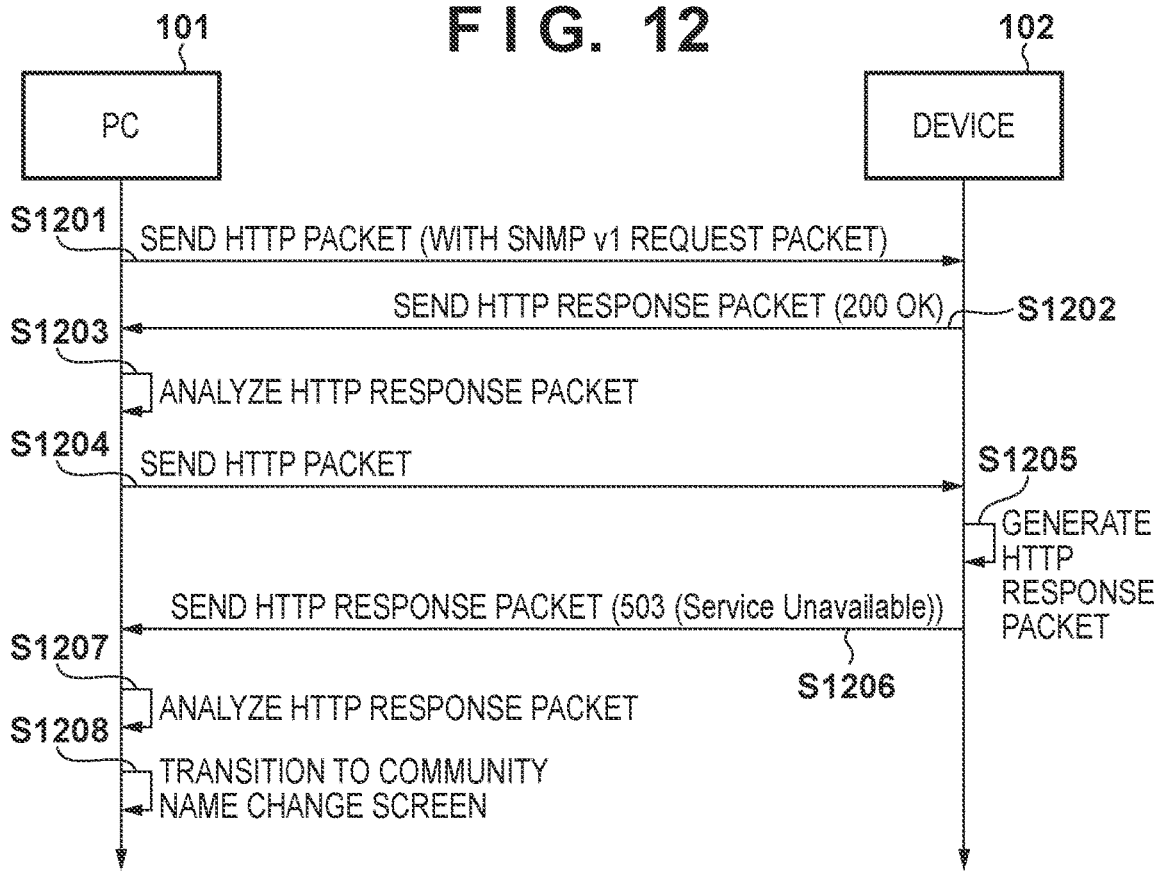
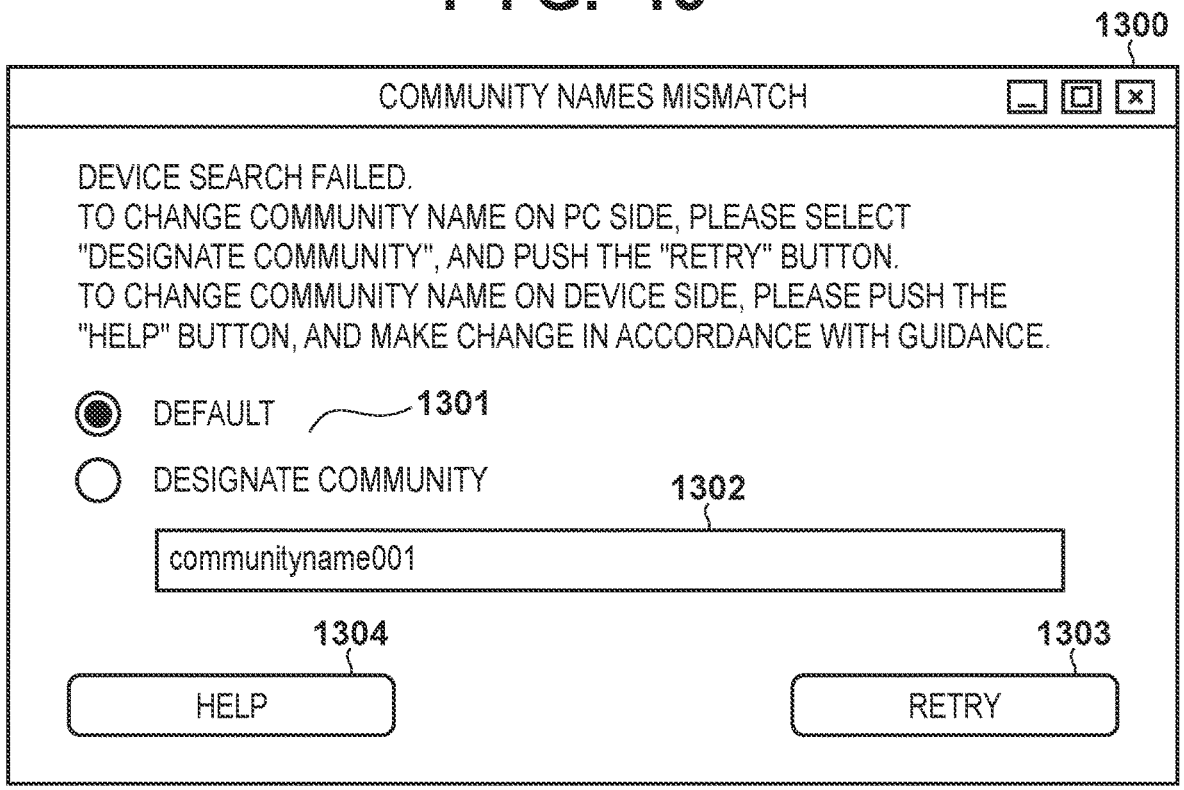

FIG. 14

| MENU | SNMPv1 SETTING |
|---|---|
| DEVICE STATE | EXCLUSIVE COMMUNITY SETTING<br>MIB ACCESS RESTRICTION<br>● READ/WRITE<br>○ ONLY READ<br>○ DISABLED<br><br>COMMUNITY SETTING<br>MIB ACCESS RESTRICTION<br>● READ/WRITE<br>○ ONLY READ<br><br>COMMUNITY NAME<br>(NUMBER OF CHARACTERS: WITHIN 32 CHARACTERS)<br>[              ]<br><br>[ OK ] |
| UTILITY | |
| MAIN BODY SETTINGS | |
| JOB MANAGEMENT | |
| SECURITY | |
| LAN SETTINGS | |
| LANGUAGE SELECTION | |

ADMINISTRATOR MODE  LOG OFF

1400

| DEVICE STATE | STATUS CODE OF EXTENSION HEADER UNIT |
|---|---|
| WHEN BOTH SNMPv1/v3 ARE DISABLED | 551(SNMP Invalid) |
| WHEN SNMPv1 IS DISABLED | 552(SNMPv1 Invalid) |
| WHEN SNMPv3 IS DISABLED | 553(SNMPv3 Invalid) |
| COMMUNITY NAME MISMATCH | 554(communityname mismatch) |
| SNMP COMMUNICATION IS NOT SUPPORTED | 555(Non-supportSNMPoverUSB) |
|  |  |

COMMUNICATION METHOD AND CONTROL METHOD IN INFORMATION PROCESSING APPARATUS

BACKGROUND OF THE INVENTION

Field of the Invention

The present invention relates to a communication method and a control method in an information processing apparatus.

Description of the Related Art

In recent years, network devices (such as printers, and the like) have supported multiple protocols. The specification of U.S. Pat. No. 9,537,808 discloses a technique in which a PC communicates with such a network device.

The specification of U.S. Pat. No. 9,537,808 describes a technique in which a packet of SNMP (Simple Network Management Protocol) which is used as a protocol for acquiring information in communication between a PC and a network device is communicated within a TCP packet (e.g., HTTP (Hypertext Transfer Protocol)).

According to the technique of the specification of U.S. Pat. No. 9,537,808, when the device is unable to generate an SNMP response packet, the device sends an HTTP response packet that does not include an SNMP response packet to the PC. Meanwhile, since the HTTP response packet that the PC receives does not include an SNMP response packet, the PC cannot identify the reason why the device could not generate the SNMP packet. As a result, user convenience may suffer.

SUMMARY OF THE INVENTION

According to one aspect of the present invention, there is provided a method for communicating between apparatuses, the method comprising: in a first apparatus, generating a second packet according to a second protocol, the second packet including a first packet according to a first protocol; in the first apparatus, sending the generated second packet to a second apparatus; in the second apparatus, receiving the second packet; in the second apparatus, determining whether a response to the first packet included in the second packet is possible; and in the second apparatus, in a case where it is determined that a response to the first packet is impossible, including status information corresponding to a cause for the impossibility of the response in a response packet corresponding to the second packet and sending the response packet to the first apparatus.

According to another aspect of the present invention, there is provided a control method executed in an information processing apparatus capable of communicating with an external apparatus by using a first protocol and a second protocol, the method comprising: generating a second packet according to the second protocol, the second packet including a first packet according to the first protocol; sending the generated second packet to the external apparatus; receiving a response packet from the external device for the second packet, the response packet including status information corresponding to a cause for impossibility of a response to the first packet; and executing a process defined in association with status information included in the response packet in accordance with the status information.

According to another aspect of the present invention, there is provided a control method to be executed in an information processing apparatus capable of using a first protocol and a second protocol to communicate with an external apparatus, the method comprising: receiving from the external apparatus a second packet according to the second protocol, the second packet including a first packet according to the first protocol; determining whether or not a response to the first packet included in the second packet is possible; in a case where it is determined that a response to the first packet is impossible, including status information corresponding to a cause for the impossibility of the response in a response packet corresponding to the second packet and sending the response packet to the external apparatus.

According to the present invention, it is possible to improve user convenience.

Further features of the present invention will become apparent from the following description of exemplary embodiments (with reference to the attached drawings).

BRIEF DESCRIPTION OF THE DRAWINGS

FIG. 4 is a diagram illustrating an example of a software configuration of the PC according to the present invention.

FIG. 5 illustrates an example of an HTTP packet configuration.

FIG. 10 illustrates an example of a screen for a remote UI for enabling/disabling SNMPv1/v3 functions of the device.

FIG. 11 is a sequence diagram illustrating a process when SNMPv1 is disabled in the device.

FIG. 12 is a sequence diagram illustrating a process when community names of SNMPv1 request packets do not coincide with each other.

FIG. 13 is a diagram illustrating an example of a screen for changing a community name on the PC side.

FIG. 14 illustrates an example of a screen for a remote UI for setting a community name of SNMPv1 of the device.

DESCRIPTION OF THE EMBODIMENTS

Hereinafter, preferred embodiments of the present invention will be described in detail with reference to the accompanying drawings. Note, the following embodiments are not intended to limit the invention according to the scope of the claims. In addition, not all combinations of features described in the following embodiments are essential to solving the problems that the present invention addresses.

First Embodiment

[System Configuration]

Figure 1:
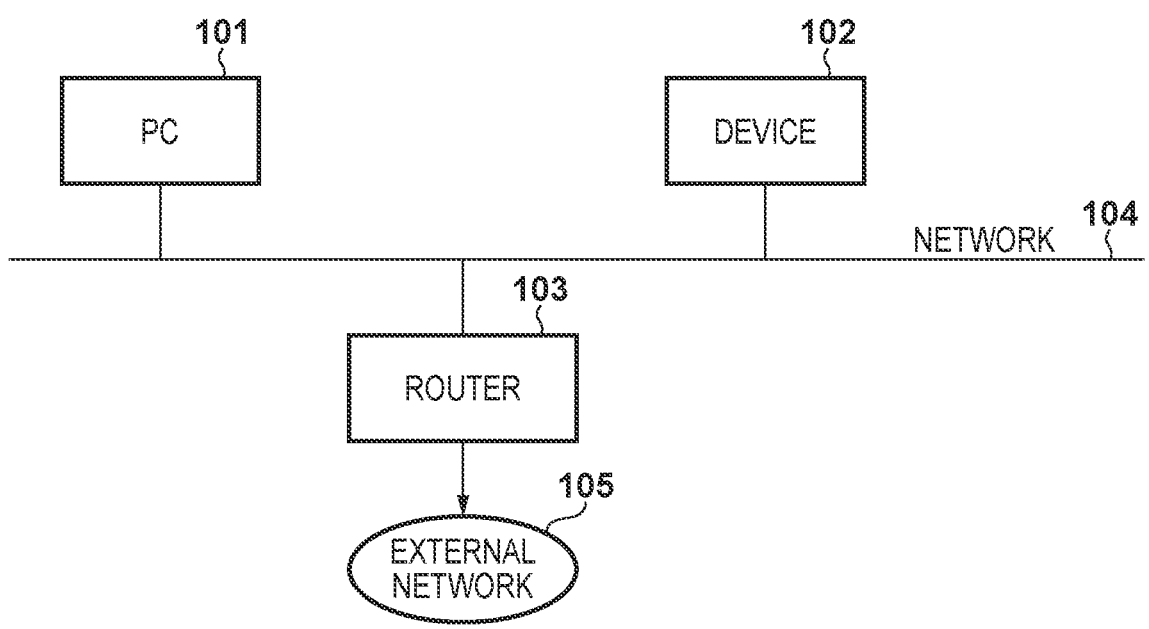
FIG. 1 is a diagram illustrating an example of a system configuration according to the present invention.

FIG. 1 is a block diagram illustrating an exemplary configuration of a network system including a PC 101 which is an information processing device. In the system illustrated in FIG. 1, the PC 101, a device 102, and a router 103 are connected via a network 104. Each apparatus performs communication using each of TCP (Transmission Control Protocol) and UDP (User Datagram Protocol) protocols. The network 104 is connected to an external network 105 via a router 103. The network 104 may be wired or wireless. The device 102 is a peripheral device such as a printer, a copying machine, a facsimile machine, a scanner, or the like, or an apparatus having multiple functions. The router 103 has a DHCP (Dynamic Host Configuration Protocol) server function and assigns IP addresses to the PC 101 and the device 102. Although only one PC 101 and device 102 is illustrated in FIG. 1, the present invention is not limited thereto, and more apparatuses may be installed in the network 104, and communication may be performed between these apparatuses.

[Hardware Configuration]

Figure 2:
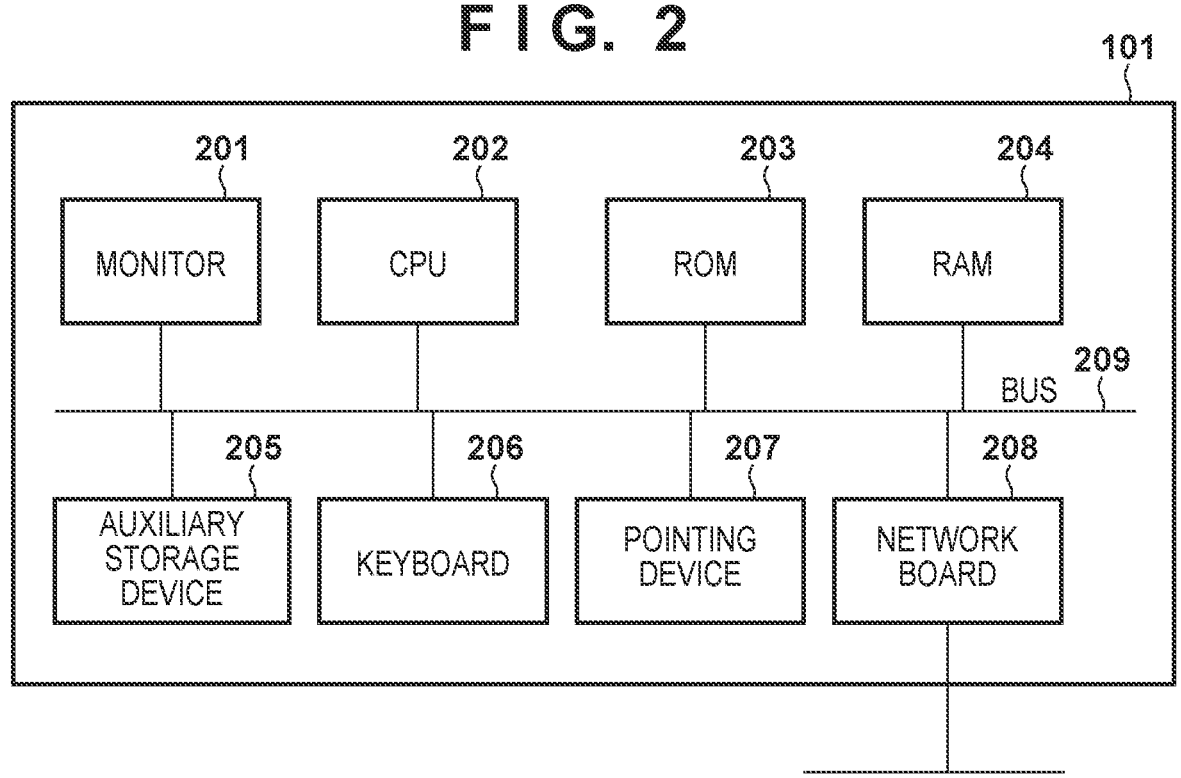
FIG. 2 is a diagram illustrating an example of a hardware configuration of a PC according to the present invention.

FIG. 2 is a diagram illustrating an exemplary hardware configuration of the PC 101 according to the present embodiment. The PC 101 includes a monitor 201, a CPU 202, a ROM 203, a RAM 204, an auxiliary storage device 205, a keyboard 206, a pointing device 207, and a network board 208. The components are communicably connected to each other via a bus 209. The monitor 201 displays a UI of an application such as an application 401 or a driver. The CPU (Central Processing Unit) 202 is a processing unit that controls the entire PC 101. The CPU 202 loads programs such as applications and drivers stored in the ROM (Read Only Memory) 203 and the auxiliary storage device 205 into the RAM (Random Access Memory) 204, and executes the loaded programs.

The ROM 203 stores basic software such as a BIOS (Basic Input/Output System) and various programs for realizing processes executed by the PC 101. The RAM 204 temporarily stores software such as applications and drivers and data used by the software. The auxiliary storage device 205 is a non-volatile storage unit, and is, for example, a hard disk. The auxiliary storage device 205 stores software (programs) such as an OS (Operating System), applications, drivers, and various modules. Drivers stored in the auxiliary storage device 205 include a device driver for controlling the device 102. According to functions of the device 102, these device drivers include a scanner driver, a printer driver, a facsimile driver, or the like. The drivers stored in the auxiliary storage device 205 include a display control driver for controlling display on the monitor 201, a keyboard driver for controlling the keyboard 206, and a pointing device driver for controlling the pointing device 207. Further, drivers stored in the auxiliary storage device 205 include a network driver for controlling communication of the network board 208. The auxiliary storage device 205 includes the application 401, an SNMP library 402, and an HTTP library 403, which will be described later with reference to FIG. 4.

The application 401 has a function for searching for a device by TCP/IP and a function for setting information to the device by TCP/IP. The application 401 may call a module having a corresponding search function and a corresponding information setting function to execute these functions. The search function and the information setting function may be provided in different modules. The keyboard 206 and the pointing device 207 are input devices for inputting instructions from the user. The network board 208 communicates with external devices via the network 104.

Figure 3:
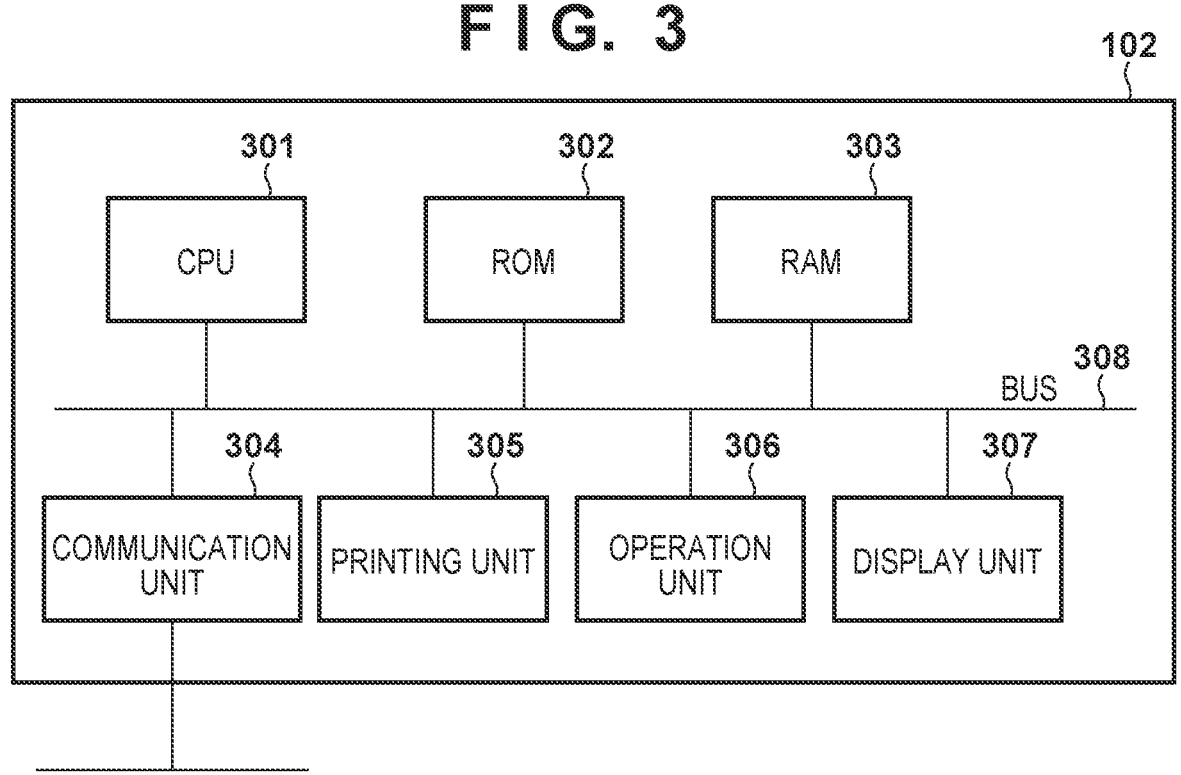
FIG. 3 is a diagram illustrating an example of a hardware configuration of a device according to the present invention.

The hardware configuration illustrated in the device 102 of FIG. 3 is an example of a hardware configuration for when the device 102 is a printer. The device 102 includes a CPU 301, a ROM 302, a RAM 303, a communication unit 304, a printing unit 305, an operation unit 306, and a display unit 307. The various components configuring the device 102 are communicatively connected to one another via a bus 308. The CPU 301 is, for example, a microprocessor. The CPU 301 functions as a central processing unit for the device 102. The CPU 301 loads a program stored in the ROM 302 into the RAM 303 and executes the loaded program, thereby controlling the communication unit 304, the printing unit 305, the operation unit 306, and the display unit 307. The ROM 302 stores various programs for realizing processes executed by the device 102. The RAM 303 is used as a work area of the CPU 301. The RAM 303 temporarily stores various data. The communication unit 304 communicates with other devices via the network 104. The printing unit 305 prints image data on a printing medium such as paper, for example.

The operation unit 306 is configured by an input device such as buttons or a touch panel. The display unit 307 displays screens for operating the device 102 and various information of the device 102. When the device 102 is a device other than a printer, the device 102 includes other components in place of or in addition to the printing unit 305. For example, when the device 102 is a scanner, the device 102 includes a reading unit that reads an image on a document as another configuration. Accordingly, the device 102 is not limited to the above-described configuration, and may include corresponding parts in accordance with a function or service to be provided.

[Software Configuration]

FIG. 4 is a block diagram illustrating an exemplary configuration of software in the PC 101 which communicates with the device 102. The PC 101 includes an application 401, an SNMP library 402, and an HTTP library 403. Each unit illustrated in FIG. 4 is realized by the CPU 202 of the PC 101 reading and executing the application 401 stored in the auxiliary storage device 205. The application 401 is, for example, a device management application for checking the status of a device found in a search or checking whether print data can be sent to a device found in the search. The application 401 may be a set-up application that installs a device driver of the device 102 in the PC 101.

In the present embodiment, the application 401 searches for a device in the same network, and displays detected devices on the monitor 201. On the other hand, if a device in the same network cannot be found, the application 401 displays on the monitor 201 that the device detection has failed. The SNMP library 402 is a library file used by the application 401, and generates an SNMP request packet included in the body portion of an HTTP packet. The SNMP library 402 analyzes the SNMP response packet received from the device 102.

The HTTP library 403 is a library file that the application 401 uses, and incorporates an SNMP request packet generated by the SNMP library 402 in a body portion of an HTTP packet. The HTTP library 403 analyzes an HTTP response packet received from the device 102. At this time, when an SNMP response packet is included in the body portion of the HTTP response packet, the HTTP library 403 transfers the SNMP response packet to the SNMP library 402.

[Packet Configuration]

FIG. 5 is a diagram illustrating an exemplary configuration of an HTTP response packet that includes an SNMP response packet according to the present embodiment, which is generated by the device 102. An SNMP response packet is incorporated in a body portion 502 of an HTTP response packet 500. A header portion 501 of the HTTP response packet 500 includes an HTTP status code indicating the cause of failure of the device 102 to generate the SNMP response packet. The PC 101 and the device 102 are provided with a table as will be described later with reference to FIG. 6. Therefore, for example, the PC 101 can recognize a state of the device from the status code included in the header portion of the HTTP response packet 500 received from the device 102. In the present embodiment, the reason why the SNMP response packet cannot be generated is indicated by the status code, but other information may be used. For example, text data status information may indicate the reason why the SNMP response packet cannot be generated. Here, examples of information included in the SNMP response packet will be described. For example, the application 401 generates an SNMPv1 request packet requesting to obtain the IP address of the device 102, includes the request packet in the body portion of an HTTP packet, and sends the packet to the device. It should be noted that the send timing is, for example, step S701 of FIG. 7 or step S1101 of FIG. 11, which will be described later. In this case, the SNMP response includes the IP address. In addition, the application 401 generates an SNMPv1 request packet for requesting an SSID and communication mode of a router to which the device 102 is connected, as network information of the device 102, and sends the generated request packet to the device by including the generated request packet in the body portion of the HTTP packet. In this case, the SNMP response includes the SSID of the router to which the device 102 is connected and wired mode/ wireless mode information as the communication mode.

Figures 6, 7:
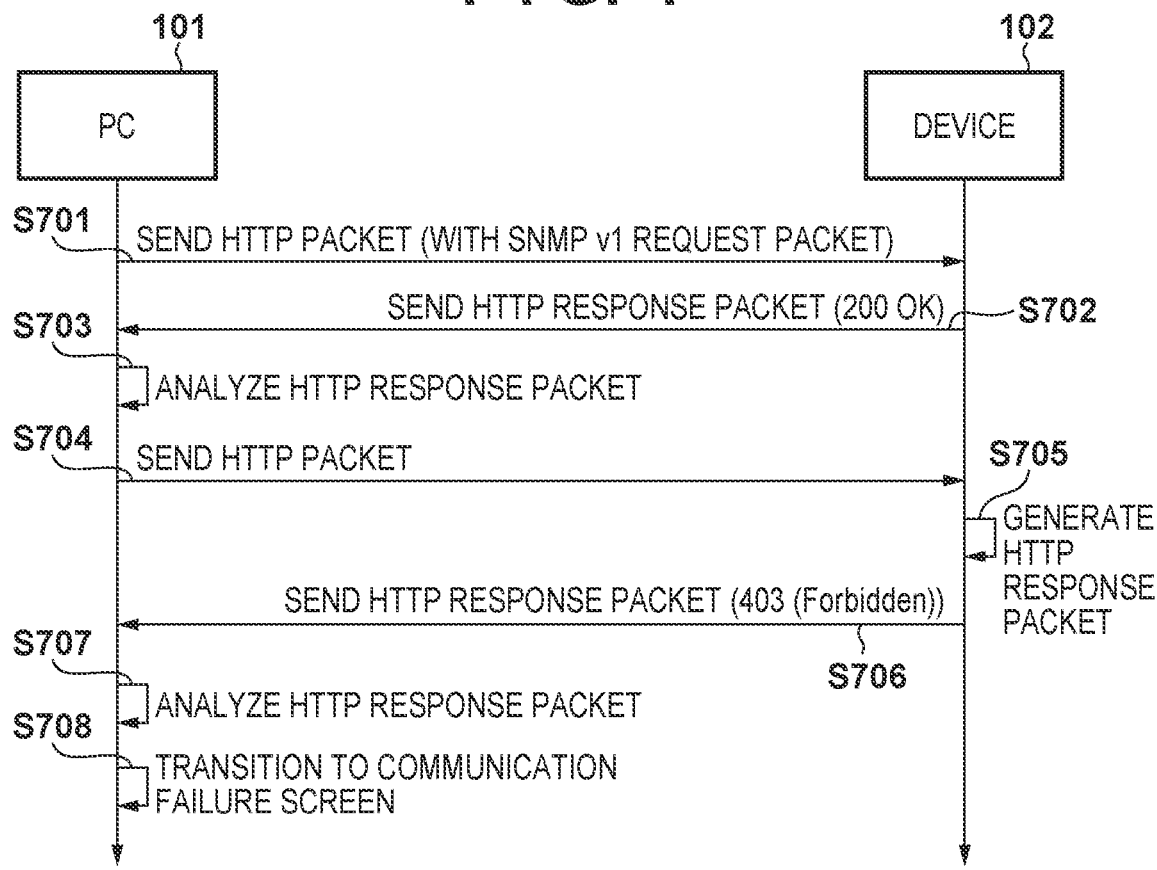
FIG. 6 is a diagram illustrating the relationship between SNMP settings of the device and statuses of header portions.
FIG. 7 is a sequence diagram illustrating a process when SNMPv1/v3 is disabled in the device.

FIG. 6 illustrates examples of the correspondences between the codes represented in the header portion 501 of the HTTP response packets and states of the device 102 according to the present embodiment. In the present embodiment, the reasons why an SNMP response packet cannot be generated are expressed in association with standard status codes of HTTP. For example, when "404 (Not Found)" is set as the status in the header portion 501 of the HTTP response packet 500 received from the device 102, the status of the device 102 indicates that "SNMP communication is not supported". A specific operation will be described later together with a sequence diagram.

In the present embodiment, the PC 101 and device 102 are configured to be compatible with HTTP (HyperText Transfer Protocol) and SNMP (Simple Network Management Protocol). In addition, they are configured to support both the SNMPv1 (version 1) function and the SNMPv3 (version 3) function. In the device 102, it is possible to set each function to be enabled/disabled.

[Sequence]

Hereinafter, a sequence of processing according to the state of the device 102 according to the present embodiment will be described with reference to the drawings.

(A Case where SNMPv1/v3 is Disabled)

FIG. 7 illustrates a sequence for when the application 401 searches for the device 102 when both SNMPv1/v3 functions of the device 102 are disabled. Here, an example in which an SNMPv1 request is made will be described. This sequence is realized by the CPUs of the PC 101 and the device 102 reading and executing corresponding programs.

Figure 8:
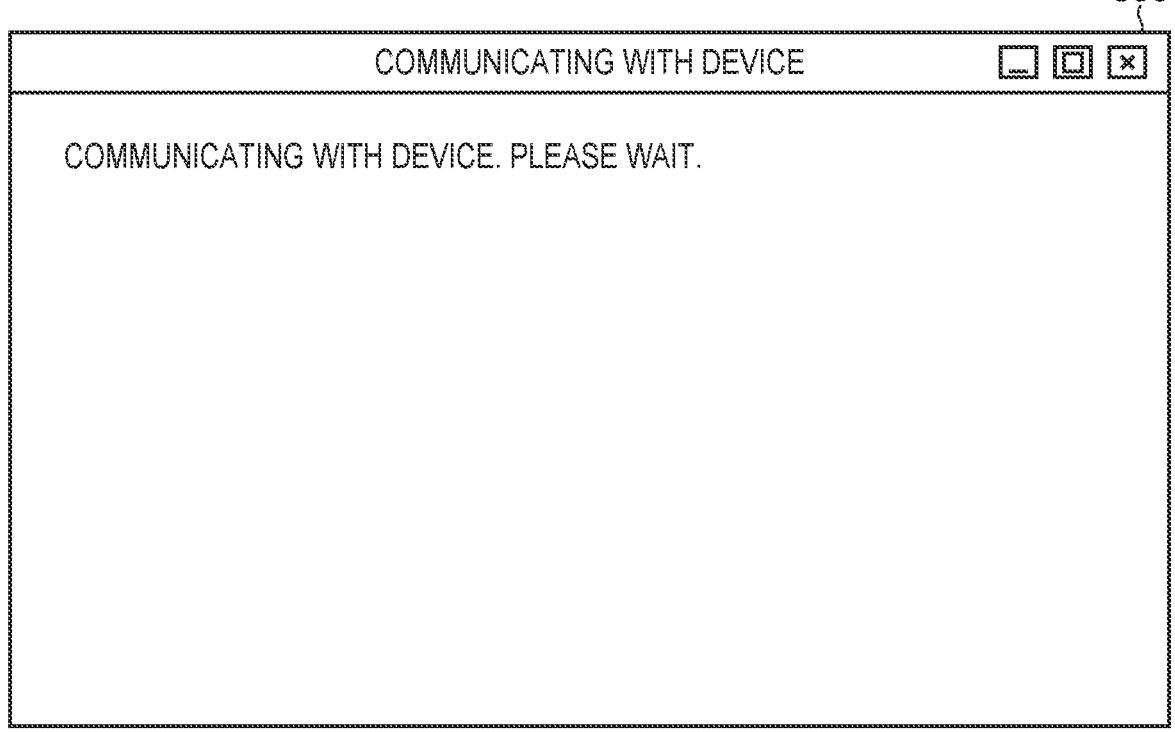
FIG. 8 is a diagram illustrating an example of a screen for when the device is in the middle of communication.

In step S701, the application 401 generates an SNMPv1 request packet and includes the packet in the body portion of an HTTP packet. Then, the application 401 sends the generated HTTP packet to the device 102. At this time, on the monitor 201 of the PC 101, the application 401 displays a screen (FIG. 8) indicating that the PC 101 is currently communicating with the device 102. FIG. 8 illustrates an example of a configuration of a screen 800 indicating that communication with the device 102 is in progress. The information displayed on the screen 800 is not limited to FIG. 8, and for example, information of the device with which the communication is being performed may also be displayed.

In step S702, the device 102 sends an HTTP response packet corresponding to the HTTP packet of step S701 to the PC 101. In a header portion of the HTTP response packet, "200 OK" which indicates that normal communication is possible is set as the status.

In step S703, the application 401 analyzes an HTTP response packet received from the device 102. As a result of the analysis, the application 401 confirms that "200 OK" is set in the status of the HTTP response packet.

In step S704, the application 401 sends an HTTP packet to the device 102 to obtain an SNMP response packet.

In step S705, the device 102 generates an HTTP response packet corresponding to the HTTP packet received in step S704. At this time, in the device 102, both of the SNMPv1/v3 functions of the device 102 are set to be disabled. Therefore, the status code "403 Forbidden", which indicates that the generation of the SNMP response packet has failed, is set in the header portion 501 of the HTTP response packet 500. That is, in this case, the SNMPv1 response is not possible, and the status code is returned.

In step S706, the device 102 sends the HTTP response packet 500 generated in step S705 to the PC 101.

In step S707, the application 401 analyzes the HTTP response packet 500 received from the device 102. The application 401 confirms as the result of the analysis that the status code "403 Forbidden" is set as the status in the header portion 501 of the HTTP response packet 500. The application 401 recognizes that SNMPv1 and v3 of the device 102 are disabled based on the status code and the table of FIG. 6. The application 401 deems that the SNMP response packet cannot be generated because the SNMPv1/v3 functions of the device 102 are both disabled. Therefore, the application 401 determines communication failure without retrying the communication since it would obviously fail if performed again.

In step S708, the application 401 interrupts the communication without retrying communication with the device 102. Then, the application 401 displays a screen (FIG. 9) indicating that the communication with the device 102 has failed. Then, the sequence ends. In the above-described example, an SNMPv1 packet is used, but the sequence is similar for SNMPv3.

Figure 9:
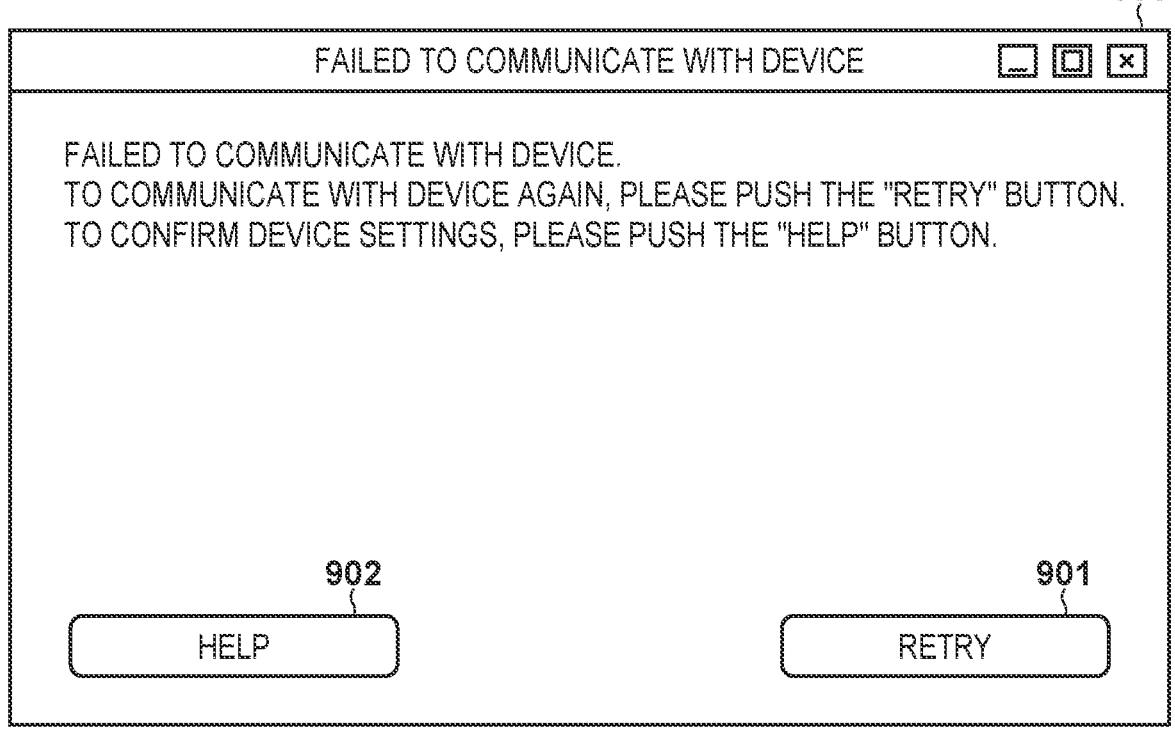
FIG. 9 is a diagram illustrating an example of a screen for when the device failed at communication.

FIG. 9 illustrates an example of a screen 900 of the application 401 displayed on the monitor 201 of the PC 101 by the application 401 when the application 401 fails to communicate with the device 102 in the present embodiment. A retry button 901 and a help button 902 are provided on the screen 900. The retry button 901 is a button for starting communication between the PC 101 and the device 102 again after the user changes an SNMP setting of the device 102, and retransmitting the packet. The help button 902 is a button for displaying a manual page (not illustrated) for guidance of various types of help information on the monitor 201 of the PC 101. Here, a case where the help button 902 of FIG. 9 displayed through the process of FIG. 7 is pressed will be described. When the help button 902 is pressed, a method of accessing a remote UI screen (FIG. 10) for changing SNMPv1/v3 settings of the device 102, a method of enabling SNMP functions of the device, and the like are displayed as help information.

FIG. 10 is a diagram illustrating an exemplary remote UI screen 1000 of the device 102 for changing SNMPv1/v3 settings. The remote UI screen 1000 is displayed on a Web browser (not illustrated) of the PC 101. By accessing the device 102 via a Web browser (not illustrated) of the PC 101, a user can make various settings for the device 102 by the remote UI function provided by the device 102. Note that the information that can be set on the remote UI screen 1000 is not limited to that illustrated in FIG. 10, and other information may be set.

(A Case where SNMPv1 is Disabled and SNMPv3 is Enabled)

FIG. 11 illustrates a sequence for when the application 401 searches for the device 102 when only the SNMPv1 function of the device 102 is disabled. That is, it is assumed that the SNMPv3 function is enabled in this sequence. This sequence is realized by the CPUs of the PC 101 and the device 102 reading and executing corresponding programs.

In step S1101, the application 401 generates an SNMPv1 request packet and includes the packet in the body portion of an HTTP packet. Then, the application 401 sends the generated HTTP packet to the device 102. At this time, on the monitor 201 of the PC 101, the application 401 displays the screen 800 indicating that the PC 101 is currently communicating with the device 102.

In step S1102, the device 102 sends an HTTP response packet corresponding to the HTTP packet received in step S1101 to the PC 101. In a header portion of the HTTP response packet, the status code "200 OK" which indicates that normal communication is possible is set as the status.

In step S1103, the application 401 analyzes the HTTP response packet received from the device 102. As a result of the analysis, the application 401 confirms that the status code "200 OK" is set in the status of the HTTP response packet.

In step S1104, the application 401 sends an HTTP packet to the device 102 to obtain an SNMP response packet.

In step S1105, the device 102 generates an HTTP response packet corresponding to the HTTP packet received in step S1104. At this time, the device 102 sets the status code "204 No Content" indicating that the generation of the SNMP response packet has failed because the SNMPv1 function of the device 102 is disabled in the header portion 501 of the HTTP response packet 500. That is, this status code indicates that either one of SNMPv1/v3 is disabled as illustrated in FIG. 6.

In step S1106, the device 102 sends an HTTP response packet 500 generated in step S1105 to the PC 101.

In step S1107, the application 401 analyzes the HTTP response packet 500 received from the device 102. As a result of the analysis, the application 401 confirms that the status code "204 No Content" is set as the status in the header portion 501 of the HTTP response packet 500. Since the status code is set, the application 401 determines that the function corresponding to the sent SNMP request packet (here, the SNMPv1 function) is disabled in the device 102. Then, the application 401 deems that the device 102 cannot generate SNMPv1 response packets.

In step S1108, the application 401 does not retry this communication because it is obvious that the communication using the SNMPv1 packets will fail even if it is performed again, and attempts a request in SNMPv3 as an alternative option. In other words, the application 401 generates an SNMPv3 request packet and includes the packet in the body portion of an HTTP packet. Then, the application 401 sends the generated HTTP packet to the device 102. The switching to the alternative option is automatically performed by the application 401.

In step S1109, the device 102 sends an HTTP response packet corresponding to the HTTP packet received in step S1108 to the PC 101. In a header portion of the HTTP response packet, the status code "200 OK" which indicates that normal communication is possible is set as the status.

In step S1110, the application 401 analyzes an HTTP response packet received from the device 102. As a result of the analysis, the application 401 confirms that the status code "200 OK" is set in the status of the HTTP response packet.

In step S1111, the application 401 sends an HTTP packet to the device 102 to obtain an SNMPv3 response packet.

In step S1112, the device 102 generates an HTTP response packet 500 including a response packet to the SNMPv3 request packet received in step S1108. Here, the status code "200 OK" is set as the status in the header portion 501 of the HTTP response packet 500. An SNMPv3 response packet is incorporated in the body portion 502 of the HTTP response packet 500.

In step S1113, the device 102 sends an HTTP response packet 500 generated in step S1112 to the PC 101.

In step S1114, the application 401 analyzes the HTTP response packet 500 received in step S1113, and analyzes the SNMP response packet included in the body portion 502 of the HTTP response packet 500. As a result of the analysis, the application 401 confirms that the status code "200 OK" is set in the status of the HTTP response packet 500, and deems that it was able to communicate normally. Then, the sequence ends.

As described above, according to FIG. 11, the application 401 can recognize that SNMP packets of a different version are valid based on the status code included in the header portion 501 of the HTTP response packet 500 received in step S1106. As a result, since the application 401 attempts a request by changing versions in step S1008 (by changing from v1 to v3 in FIG. 11), required information can be easily acquired from the device 102.

(The Case where Community Names do not Match)

FIG. 12 illustrates a sequence between the PC 101 and the device 102 for when a community name set in an SNMPv1 request packet does not match a community name set in the device 102. This sequence is realized by the CPUs of the PC 101 and the device 102 reading and executing corresponding programs.

In step S1201, the application 401 generates an SNMPv1 request packet and includes the packet in the body portion of an HTTP packet. Then, the application 401 sends the generated HTTP packet to the device 102. At this time, on the monitor 201 of the PC 101, the application 401 displays the screen 800 indicating that the PC 101 is currently communicating with the device 102.

In step S1202, the device 102 sends an HTTP response packet corresponding to the HTTP packet received in step S1201 to the PC 101. In a header portion of the HTTP response packet, "200 OK" which indicates that normal communication is possible is set as the status.

In step S1203, the application 401 analyzes the HTTP response packet received from the device 102. As a result of the analysis, the application 401 confirms that the status code "200 OK" is set in the status of the HTTP response packet.

In step S1204, the application 401 sends an HTTP packet to the device 102 to obtain an SNMP response packet.

In step S1205, the device 102 generates an HTTP response packet corresponding to the HTTP packet received in step S1204. At this time, the device 102 sets the status code "503 Service Unavailable" indicating that the community names of the device 102 and the SNMPv1 request packet do not coincide with each other in the header portion 501 of the HTTP response packet 500. That is, this status code indicates that the community names do not match as illustrated in FIG. 6.

In step S1206, the device 102 sends an HTTP response packet 500 generated in step S1205 to the PC 101.

In step S1207, the application 401 analyzes the HTTP response packet 500 received from the device 102. As a result of the analysis, the application 401 confirms that the status code "503 Service Unavailable" is set as the status in the header portion 501 of the HTTP response packet 500. Since the status code is set, the application 401 determines that the SNMP response packet cannot be generated because the community names do not coincide with each other, and deems that the device 102 cannot generate the SNMP response packet. Since the communication with the device 102 will obviously fail even if performed again due to the mismatch of the community names, the application 401 determines communication failure without retrying the communication.

In step S1208, the application 401 does not retry communication with the device 102, and transitions to a screen (FIG. 13) for prompting the user to change the community name on the PC 101. Then, the sequence ends.

FIG. 13 illustrates an example of a screen 1300 displayed when a mismatch occurs between the community names in communication between the PC 101 and the device 102 in the present embodiment. The screen 1300 is displayed on the monitor 201 of the PC 101, and the community name on the PC 101 can be changed thereon. The radio button 1301 is a setting item for selecting whether to use the community name set by the vendor of the device 102 by default or to designate an arbitrary community name by the user. The text box 1302 is a setting item for specifying an arbitrary community name to be set by the user. The retry button 1303 is a button for restarting the communication with the device 102 with the community name specified by the radio button 1301 and the text box 1302. The help button 1304 is a button for displaying a manual page (not illustrated) for guidance of various types of help information on the monitor 201 of the PC 101. Here, a case where the help button 1304 of FIG. 13 displayed through the process of FIG. 12 is pressed will be described. When the help button 1304 is pressed, a method of accessing a remote UI screen (FIG. 14) for changing the community name of the device 102, a method of setting the community name of the device 102, and the like are displayed as help information, for example.

FIG. 14 is a diagram illustrating an exemplary remote UI screen 1400 of the device 102 for changing SNMPv1 community name settings. The remote UI screen 1400 is displayed on a Web browser (not illustrated) of the PC 101. Note that the information that can be set on the remote UI screen 1400 is not limited to that illustrated in FIG. 14, and other information may be set.

(A Case where SNMPv1 is Enabled and SNMPv3 is Disabled)

Figure 15:
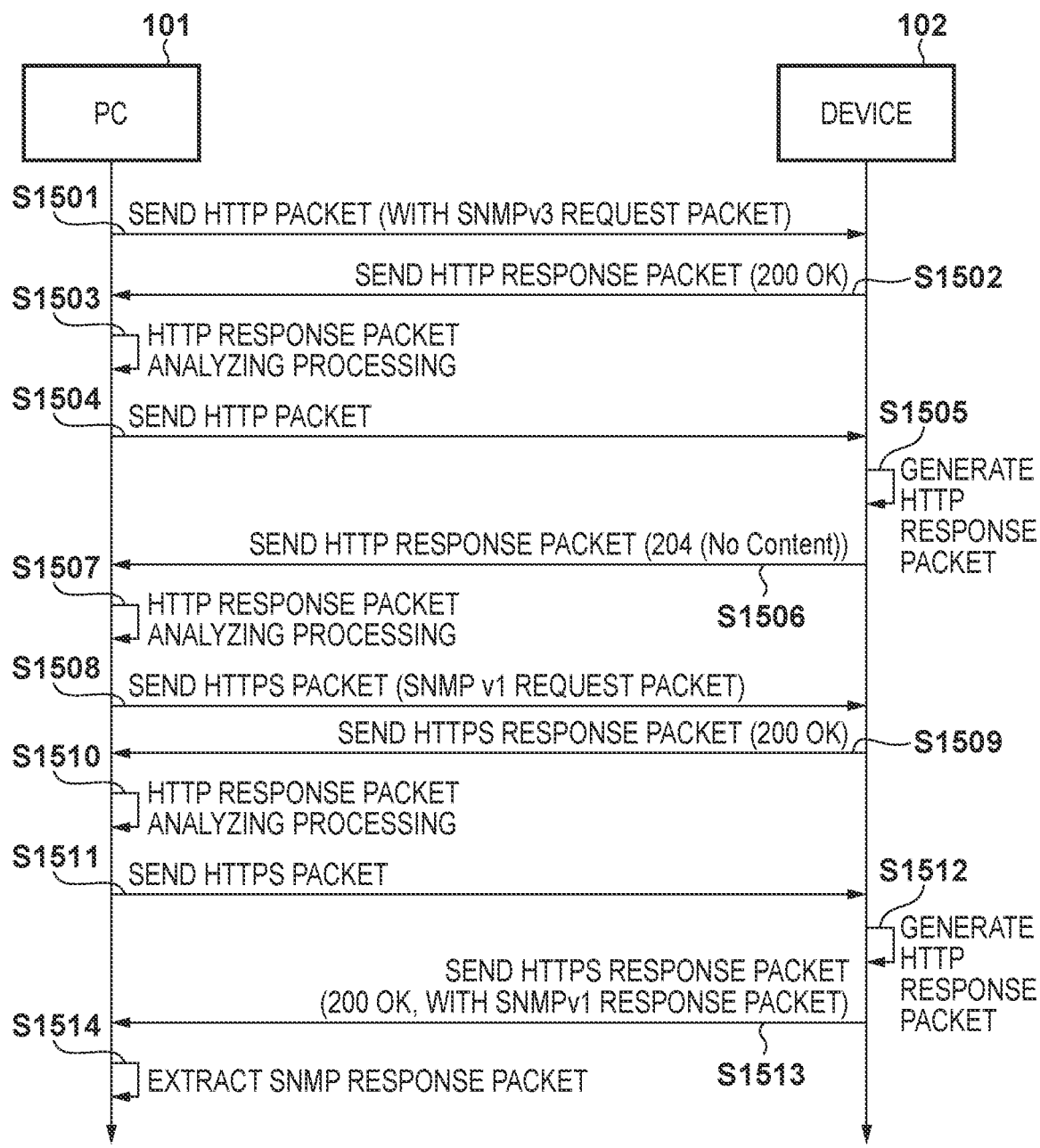
FIG. 15 is a sequence diagram illustrating a process when SNMPv3 is disabled in the device.

FIG. 15 illustrates a sequence for when the application 401 searches for the device 102 when only the SNMPv3 function of the device 102 is disabled. That is, it is assumed that the SNMPv1 function is enabled in this sequence. This sequence is realized by the CPUs of the PC 101 and the device 102 reading and executing corresponding programs.

In step S1501, the application 401 generates an SNMPv3 request packet and includes the packet in the body portion of an HTTP packet. Note that steps S1502 to S1506 are basically the same processes as steps S1102 to S1106 except that the SNMP versions differ, and therefore detailed descriptions thereof are omitted. Note that the application 401 determines whether to perform step S701 or S1501, depending on the purpose of the request. For example, when the application 401 acquires an IP address of the device 102, encryption is not necessary, and thus step S701 is executed. In other words, the application 401 sends to the device 102 an HTTP packet including an SNMPv1 request packet as in FIG. 7. Meanwhile, when the application 401 acquires a password of a router that the device 102 is connected to, encryption is not necessary, and thus step S1501 is executed.

In step S1507, the application 401 analyzes the HTTP response packet 500 received from the device 102. As a result of the analysis, the application 401 confirms that the status code "204 No Content" is set as the status in the header portion 501 of the HTTP response packet 500. Since the status code is set, the application 401 determines that the function corresponding to the sent SNMP request packet (here, the SNMPv3 function) is disabled in the device 102. Then, the application 401 deems that the device 102 cannot generate SNMPv3 response packets. The application 401 does not retry this communication because it is obvious that the communication using the SNMPv3 function will fail even if it is performed again.

In step S1508, the application 401 sends an HTTPS (Hypertext Transfer Protocol Secure) packet including the SNMPv1 request packet in the body part to the device 102 as an alternative. This uses encrypted communication over HTTPS for security considerations, since the SNMPv3 packet may contain secure information. The SNMPv3 packet can be encrypted and sent. On the other hand, SNMPv1 packets cannot be encrypted and sent. The processing thereafter of steps S1509 to S1514 is basically the same processing as steps S1109 to S1114 except that the SNMP versions differ, and therefore detailed descriptions thereof are omitted.

As described above, according to FIG. 15, the application 401 can recognize that SNMP packets of a different version are valid based on the status codes included in the header portion 501 of the HTTP response packet 500 received in step S1506. As a result, since the application 401 attempts a request by changing versions in step S1008 (by changing versions from v3 to v1 in FIG. 15), required information can be easily acquired from the device 102. At this time, since the application 401 uses an HTTPS packet including the SNMPv1 request packet in the body portion in step S1508, it is possible to reduce the security risk.

Here, another process will also be described. For example, the application 401 can remotely change the settings of the device 102. The application 401 sends, for example, an HTTP packet including an SNMPv3 request packet including setting change information in the body portion of the device 102. The device 102 that has received the HTTP packet performs setting change processing and sends an HTTP response packet. In a header portion 501 of the HTTP response packet 500, the status code "200 OK", which indicates that normal communication is possible, is set as the status. Continuing on, the application 401 sends an HTTP packet to the device 102 to obtain an SNMPv3 response packet. Here, when the device 102 is in the middle of changing the setting, the device 102 sets a status code indicating that the setting is being changed in the header portion 501 of the HTTP response packet 500, and sends the HTTP response packet 500. The application 401 can recognize that the device 102 is in the middle of changing the setting of the device 102 by analyzing the HTTP response packet 500. In such a case, the application 401 sends an HTTP packet to the device 102 to obtain an SNMPv3 response packet again. That is, even when the SNMP response is not included in the HTTP response packet 500, the application 401 can appropriately execute a retry process when a retry is necessary.

According to the present embodiment, the application 401 can establish the reason why the device 102 cannot generate the SNMP response packet. As a result, unnecessary retry processing is not needed and the user need not wait for retry processing to succeed, and the application 401 can notify the user that communication is not possible and terminate the processing. In this case, in the present embodiment, as in FIG. 6, the SNMP response packet is defined in association with the HTTP standard status code for each reason why the packet cannot be generated. As a result, the application 401 can perform an alternative process (FIG. 11 and FIG. 15) in accordance with the status code or guide the user to change the settings of the PC 101 or the device 102 (FIG. 9 and FIG. 13). Further, the application 401 can switch whether or not to execute the retry processing based on the status code.

In addition, expressing the reason why the device cannot generate the SNMP response packet as in FIG. 6 by an HTTP standard status code has the merit that the device can cope even when the protocol including the SNMP response packet does not have an extension header function. An example of the case where there is no extension header function is the case where FTP (File Transfer Protocol) or the like is used, for example.

In the present embodiment, an example is given in which an HTTP response packet in which an error indicating the reason why an SNMP packet cannot be generated is set is returned by the second HTTP response packet from the application, but the present invention is not limited thereto. For example, as in step S702 of FIG. 7, an error indicating the reason why the SNMP packet cannot be generated may be returned in an HTTP response packet corresponding to the first HTTP send packet sent by the PC.

Second Embodiment

In the first embodiment, an SNMP response packet is expressed in association with an HTTP standard status code for a respective reason why the device cannot generate the packet. When the error type is notified in a standard status code as in the first embodiment, there are cases where the application cannot properly determine the error.

For example, assume that the device has an HTTP function and a function for restricting PCs that can access the device. Assume that the PC on which an access restriction was previously placed sends an HTTP packet including the SNMP request packet to the device. In such a case, the PC receives an HTTP response packet including the status code "403 Forbidden" in the header of the HTTP response packet from the device. However, the PC cannot determine whether the communication error indicates that communication is impossible due to the HTTP communication access restriction having been set for the device, or whether both the SNMPv1/v3 are disabled. In addition, this is not limited to this example, and if HTTP and SNMP status codes are expressed in one header, it is difficult to determine on the PC which of the protocols the error is for.

In the second embodiment of the present invention, a form in which it is possible to determine whether it is an HTTP error or an SNMP error will be described with reference to the drawings. Description of configurations that are the same as in the first embodiment will be omitted.

[Packet Configuration]

Figures 16, 17:
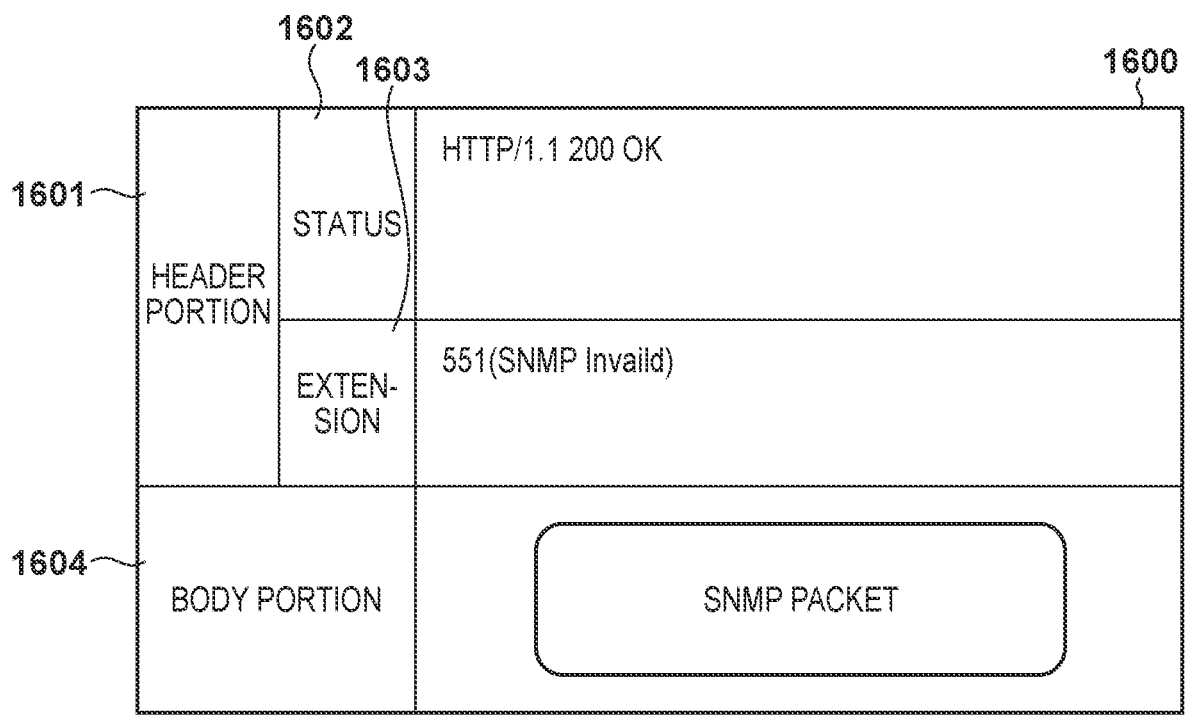
FIG. 16 illustrates an example of an HTTP packet configuration.
FIG. 17 is a diagram illustrating the relationship between reasons why an SNMP response packet of the device cannot be generated and status codes.

FIG. 16 is a diagram illustrating an exemplary configuration of an HTTP response packet including an SNMP response packet, which is generated by the device 102, according to the present embodiment. An SNMP response packet is incorporated in a body portion 1604 of an HTTP response packet 1600. A header portion 1601 of the HTTP response packet is provided with a status portion 1602 and an extension portion 1603. The status portion 1602 expresses an error that occurred in an HTTP layer. In the extension portion 1603, a status code indicating the reason why the SNMP response packet cannot be generated is expressed using a custom HTTP header function. Note that the PC 101 and the device 102 are provided with a table as will be described later with reference to FIG. 17. Therefore, for example, the PC 101 can recognize a state of the device from the status code included in the extension portion 1603 of the HTTP response packet 500 received from the device 102.

FIG. 17 is an exemplary correspondence table of status codes expressed by the extension portion 1603 of the HTTP response packet 1600 according to the present embodiment. In the present embodiment, an independent status code is used to express the cause of the inability to generate an SNMP response packet by using an HTTP custom header function so that the cause is separated from a standard HTTP status code. It is assumed that an HTTP standard status code is set in the status portion 1602.

[Sequence]

(In a Case where an Access Restriction is Set)

Figure 18:
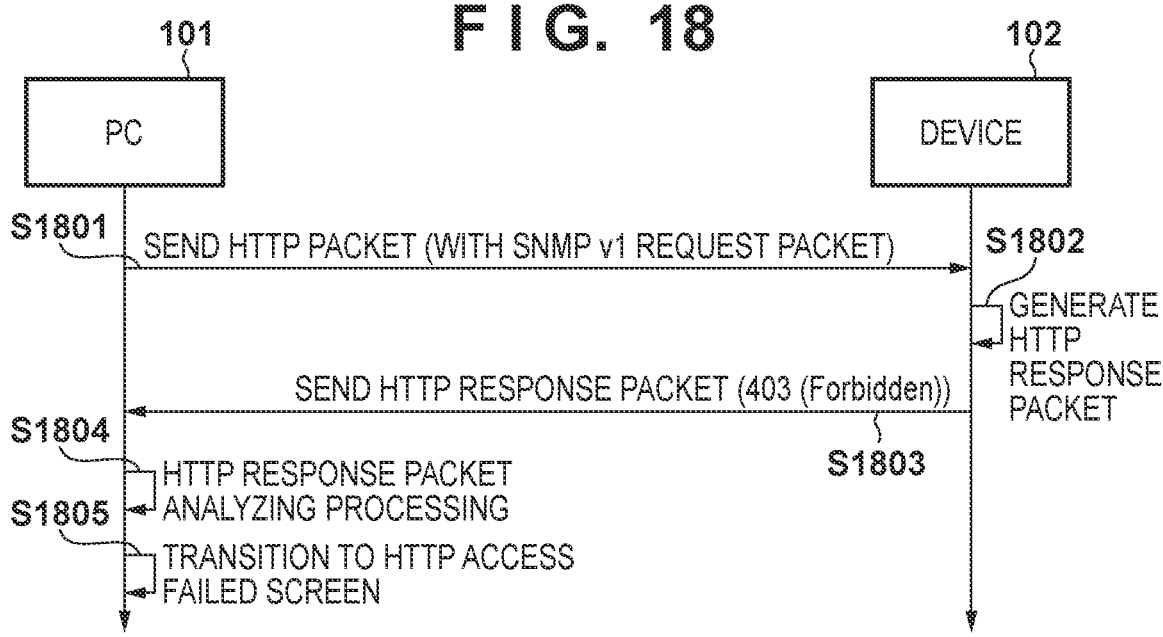
FIG. 18 is a sequence diagram illustrating a process when communication is not possible due to HTTP access restrictions.

FIG. 18 illustrates a sequence when the PC 101 cannot communicate with the device 102 due to an HTTP access restriction, according to the present embodiment. This sequence is realized by the CPUs of the PC 101 and the device 102 reading and executing corresponding programs.

In step S1801, the application 401 generates an SNMPv1 request packet and includes the packet in the body portion of an HTTP packet. Then, the application 401 sends the generated HTTP packet to the device 102. At this time, on the monitor 201 of the PC 101, the application 401 displays the screen 800 indicating that the PC 101 is currently communicating with the device 102.

In step S1802, the device 102 generates an HTTP response packet corresponding to the HTTP packet received in step S1801. At this time, the device 102 sets the status code "403 Forbidden" indicating that the HTTP access is denied in the status portion 1602 of the header portion 1601 of the HTTP response packet 1600.

In step S1803, the device 102 sends an HTTP response packet 1600 generated in step S1802 to the PC 101.

In step S1804, the application 401 analyzes the HTTP response packet 1600 received from the device 102. As a result of the analysis, the application 401 confirms that the status code "403 Forbidden" is set in the status portion 1602 of the header portion 1601 of the HTTP response packet 1600. The application 401, since the status code "403

Forbidden" is set in the status portion 1602 of the header portion 1601 of the HTTP response packet 1600, determines that an HTTP access restriction is set on the device 102 side. Since it is obvious that the HTTP communication will fail even if is performed again, the application 401 does not retry the communication and determines communication failure.

In step S1805, the application 401 displays a screen 900 indicating that the communication with the device 102 has failed. Then, the sequence ends. Note that in the above-described example, an SNMPv1 packet is used, but the sequence is similar for SNMPv3.

Figure 19:
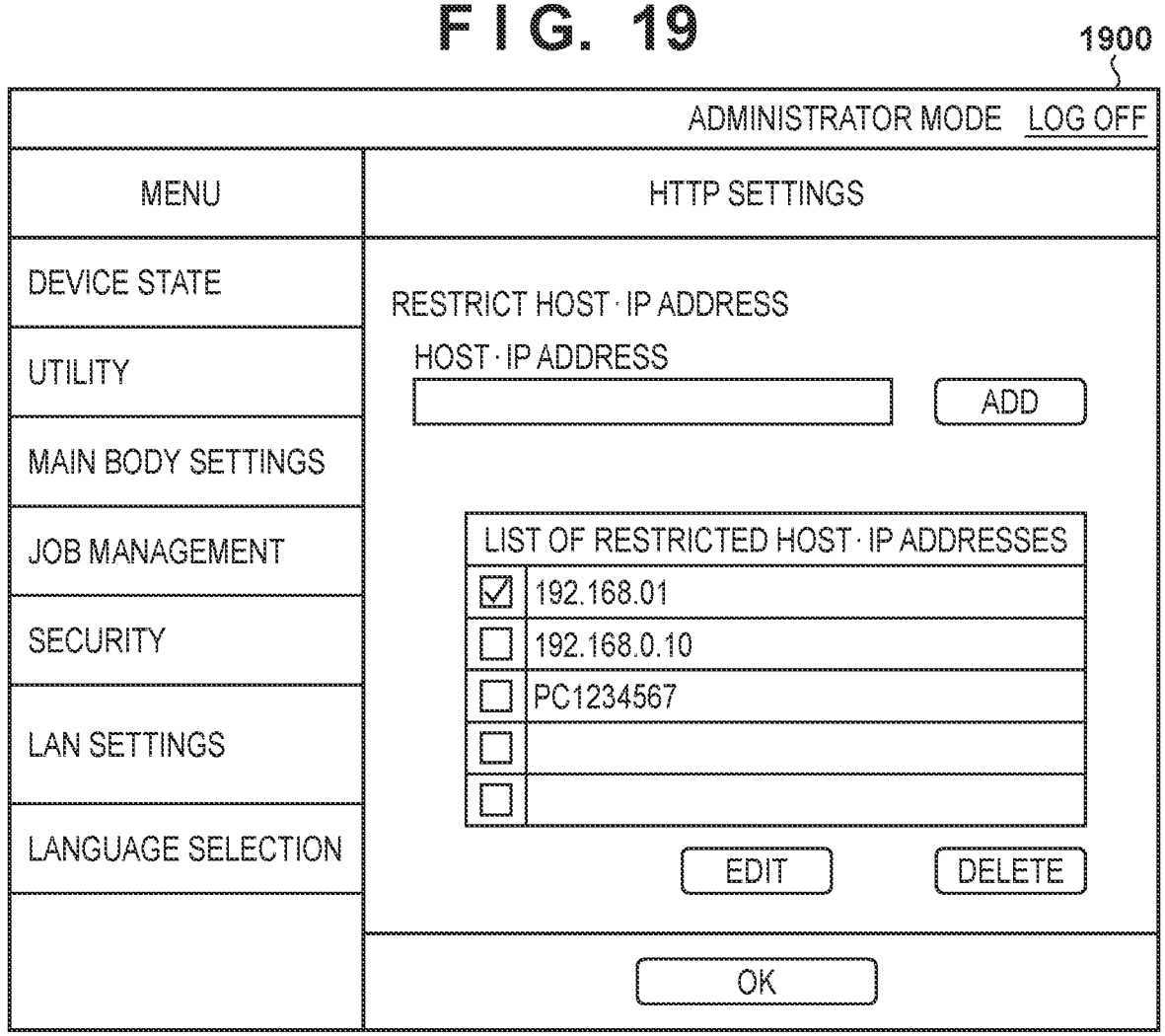
FIG. 19 is a diagram illustrating an example of a screen of a remote UI for changing HTTP settings of the device.

FIG. 19 is a diagram illustrating an example of a configuration of a remote UI for changing HTTP settings of the device 102. In step S1805 of FIG. 18, it is assumed that the screen 900 is displayed on the monitor 201 of the PC 101. At this time, when the user presses the help button 902 of the screen 900, a manual (not illustrated) in which a method for confirming the HTTP access restriction of the device 102 is described is displayed. The user can display the remote UI screen 1900 of FIG. 19 in accordance with the guidance of a manual (not illustrated) to confirm the setting content and change the setting. The remote UI screen 1900 is displayed on a Web browser (not illustrated) of the PC 101. Note that the information that can be set on the remote UI screen 1900 is not limited to that illustrated in FIG. 19, and other information may be set. Using the remote UI screen of FIG. 19, the user can select the identification information corresponding to the PC 101 and press a delete button to release the access restriction of the PC 101 set in the device 102.

(The Case where SNMPv1/v3 are Disabled)

Figure 20:
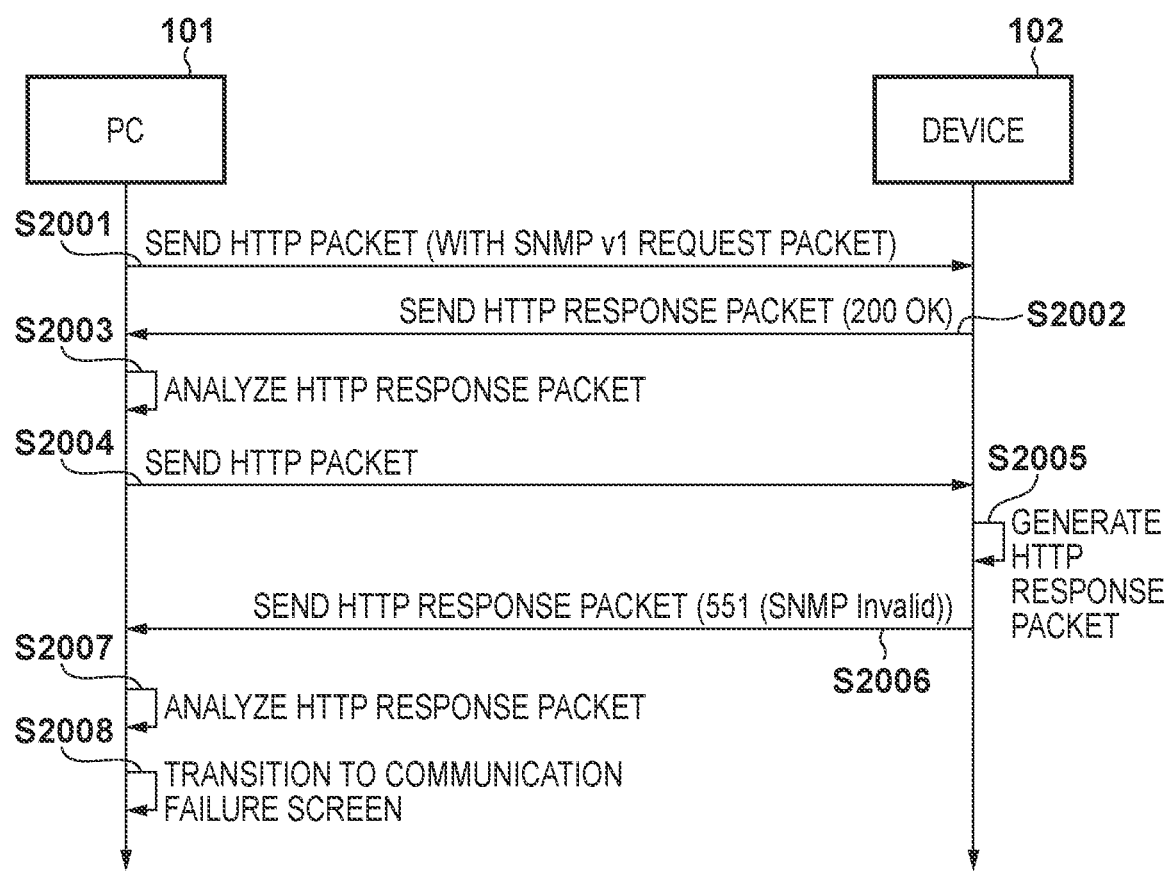
FIG. 20 is a sequence diagram illustrating a process when SNMPv1/v3 is disabled in the device.

FIG. 20 illustrates a sequence for when the PC 101 searches for the device 102 when both the SNMPv1/v3 functions of the device 102 are disabled. Here, an example in which an SNMPv1 request is made will be described. This sequence is realized by the CPUs of the PC 101 and the device 102 reading and executing corresponding programs.

In step S2001, the application 401 generates an SNMPv1 request packet and includes the packet in the body portion of an HTTP packet. Then, the application 401 sends the generated HTTP packet to the device 102. At this time, on the monitor 201 of the PC 101, the application 401 displays the screen 800 indicating that the PC 101 is currently communicating with the device 102.

In step S2002, the device 102 sends an HTTP response packet corresponding to the HTTP packet of step S2001 in the PC 101. In a header portion of the HTTP response packet, "200 OK" which indicates that normal communication is possible is set as the status.

In step S2003, the application 401 analyzes an HTTP response packet received from the device 102. As a result of the analysis, the application 401 confirms that "200 OK" is set in the status of the HTTP response packet.

In step S2004, the application 401 sends an HTTP packet to the device 102 to obtain an SNMP response packet.

In step S2005, the device 102 generates an HTTP response packet corresponding to the packet received in step S2004. At this time, in the device 102, both of the SNMPv1/v3 functions of the device 102 are set to be disabled. Therefore, the status code "551 SNMP Invalid", which indicates that the generation of the SNMP response packet has failed, is set in the extension portion 1603 of the header portion 1601 of the HTTP response packet 1600.

In step S2006, the device 102 sends an HTTP response packet 1600 generated in step S2005 to the PC 101.

In step S2007, the application 401 analyzes the HTTP response packet 1600 received from the device 102. As a result of the analysis, the application 401 confirms that the status code "551 SNMP Invalid" is set as the status in the extension portion 1603 of the header portion 1601 of the HTTP response packet 1600. As a result, the application 401 deems that the SNMP response packet cannot be generated because the SNMPv1/v3 functions of the device 102 are both disabled. Therefore, the application 401 determines communication failure without retrying the communication since it would obviously fail if performed again.

In step S2008, the application 401 displays the screen 900 indicating that the communication with the device 102 has failed without retrying the communication with the device. Then, the sequence ends. In the above-described example, an SNMPv1 packet is used, but the sequence is similar for SNMPv3.

As described above, in the present embodiment, an error occurring in HTTP is represented by an HTTP standard status code, and an error occurring in SNMP is represented by an independent status code using a custom HTTP header function. As a result, in addition to the effects of the first embodiment, it is possible to appropriately notify which of HTTP or SNMP an error has occurred in.

OTHER EMBODIMENTS

In the above embodiments, examples are given in which an information management protocol of the device uses the HTTP protocol by which to communicate, embedding an SNMP packet therein, but limitation is not made to this. For example, an IMAP (Internet Message Access Protocol) packet, which supports only TCP, may be embedded in a protocol that supports UDP (User Datagram Protocol) such as SNMP. As a result, there is an effect that even in an environment in which communication by TCP is not possible, communication with a device can be performed using UDP. As described above, the present invention may be applied to other standard protocols as long as it is possible to send and receive information to and from a device and communication between a PC and the device is possible, and the invention may be applied to protocols defined independently by a device vendor.

In the above embodiment, an example in which the PC and the device communicate with each other via a network interface has been described, but limitation is not made to this. For example, if communication using SNMP or HTTP packets can be performed via a USB (Universal Serial Bus) interface (hereinafter, via USB), the communication may be performed via USB. Especially in the case of USB, the following effects can be expected. For example, the application 401 running on a PC in which a USB driver is not installed communicates with the device via the USB. At this time, the installation of the USB driver may start on the PC side at the moment when the device is connected by the USB cable. In order to communicate with the device via the USB, the PC must wait for the USB communication until the installation of the USB driver is completed. In such a case, before the USB driver installation completes, the HTTP library 403 notifies the application 401 that zero devices were found as in the device search process. In this case, the application 401 executes a retry of the device search processing. As described above, in the case of the USB, there is a wait for processing required on the PC side in order to communicate with the device. On the other hand, when an application running on a PC in which the USB driver has been installed communicates with a device in which the USB driver cannot generate an SNMP packet, the application 401 can recognize the reason why the device cannot generate an SNMP packet. As a result, the application 401 can determine whether or not to perform retry processing, and when retry processing is unnecessary, the application 401 can proceed to the next process. As described above, unnecessary waiting for processing on the PC side can be avoided. That is, according to the present invention, the PC side is expected to have an effect of being able to discriminate between a necessary processing wait and an unnecessary processing wait.

In the above embodiments, states that cannot be represented by an SNMP standard error, such as that an SNMP function of device being disabled or community names being mismatched, are represented in an HTTP header, but limitation is not made to this. For example, SNMP standard errors (such as tooBig, noSuchName) may also be represented in header information of upper-layer protocols in which the SNMP packet is embedded. This eliminates the need to embed an SNMP response packet in the HTTP body portion, thereby reducing the packet size and communication volume.

The device 102 may be, for example, an apparatus capable of communicating with a PC, such as a digital camera or a speaker, in addition to the above-described apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-240141, filed Dec. 21, 2018, which is hereby incorporated by reference herein in its entirety.

What is claimed is:

1. A communication method for communicating between apparatuses, the communication method comprising:
   in a first apparatus, sending a HTTP (HyperText Transfer Protocol) data according to a HTTP, the HTTP data including a SNMP (Simple Network Management Protocol) data according to a SNMP;
   in a second apparatus, receiving the HTTP data;
   in the second apparatus, determining information regarding the SNMP in a case where the SNMP data is included in the HTTP data; and
   in the second apparatus, send a HTTP response including a status code for the HTTP corresponding to determination result of the information regarding the SNMP to the first apparatus,
   wherein in a case where the second apparatus cannot communicate using the SNMP, a first status code for the HTTP is included in the HTTP response,
   in a case where both of a first version of the SNMP and a second version of the SNMP are disabled, a second status code for the HTTP is included in the HTTP response,
   in a case where a community name used in the SNMP does not match a predetermined community name set, third status code for the HTTP is included in the HTTP response, and
   in a case where the second apparatus can communicate using the SNMP, fourth status code for the HTTP is included in the HTTP response.

2. The communication method according to claim 1, further comprising:
   in accordance with the status code included in the HTTP response, executing, in the first apparatus, a process defined in association with the status code included in the HTTP response.

3. The communication method according to claim 2, wherein the process is for confirming with a user whether or not to retransmit the HTTP data to the second apparatus.

4. The communication method according to claim 2, wherein the process is for interrupting retransmission of the HTTP data to the second apparatus.

5. The communication method according to claim 2, wherein the process is for guiding a user on a setting change related to the SNMP in the first apparatus or the second apparatus.

6. The communication method according to claim 2, wherein the process is for retransmitting data according to the HTTP by including a third data according to a different version of the SNMP in a case where the status code included in the HTTP response indicates that a version of the SNMP corresponding to the SNMP data is disabled.

7. An information processing apparatus capable of communicating with an external apparatus, the information processing apparatus comprising:
   one or more processors;
   one or more memories storing instructions that, when executed by the one or more processors, cause the information processing apparatus to:
      send a HTTP (HyperText Transfer Protocol) data according to a HTTP, the HTTP data including a SNMP (Simple Network Management Protocol) data according to a SNMP;
      receive a HTTP response from the external apparatus for the HTTP data, the HTTP response including a status code for the HTTP which corresponds to a determination result of information regarding the SNMP in the external apparatus; and
      execute a process corresponding to the status code,
   wherein in a case where the external apparatus cannot communicate using the SNMP, a first status code for the HTTP is included in the HTTP response, in a case where both of a first version of the SNMP and a second version of the SNMP are disabled, a second status code for the HTTP is included in the HTTP response, in a case where a community name used in the SNMP does not match a predetermined community name set, third status code for the HTTP is included in the HTTP response, and in a case where the external apparatus can communicate using the SNMP, fourth status code for the HTTP is included in the HTTP response.

8. The information processing apparatus according to claim 7, wherein the executed process is for confirming with a user whether or not to retry communication with the external apparatus.

9. The information processing apparatus according to claim 7, wherein the executed process is for interrupting retransmission of the HTTP data to the external apparatus.

10. The information processing apparatus according to claim 7, wherein the executed process is for guiding a user on a setting change related to the SNMP in the information processing apparatus or the external apparatus.

11. The information processing apparatus according to claim 7, wherein the external apparatus is a printing apparatus.

12. A communication apparatus capable of using a SNMP (Simple Network Management Protocol) and a HTTP (HyperText Transfer Protocol) to communicate with an information processing apparatus, the communication apparatus comprising:

one or more processors;

one or more memories storing instructions that, when executed by the one or more processors, cause the communication apparatus to:

receive from the information processing apparatus a HTTP data according to the HTTP, the HTTP data including a SNMP data according to the SNMP;

determine information regarding communication of the SNMP; and send a HTTP response including a status code for the HTTP corresponding to determination result of the information regarding the SNMP, wherein in a case where the communication apparatus cannot communicate using the SNMP, a first status code for the HTTP is included in the HTTP response, in a case where both of a first version of the SNMP and a second version of the SNMP are disabled, a second status code for the HTTP is included in the HTTP response, in a case where a community name used in the SNMP does not match a predetermined community name set, third status code for the HTTP is included in the HTTP response, and in a case where the communication apparatus can communicate using the SNMP, fourth status code for the HTTP is included in the HTTP response.

13. The communication apparatus according to claim 12, wherein in a case where the communication apparatus cannot perform a communication using the SNMP and in a case where the communication apparatus cannot communicate using the SNMP and in a case where both the first version of the SNMP and the second version of the SNMP are disabled, the status code for the HTTP is included in the HTTP response.

14. The communication apparatus according to claim 12, wherein the communication apparatus is a printing apparatus.

* * * * *